(12) United States Patent
Takahashi

(10) Patent No.: US 6,898,244 B1
(45) Date of Patent: May 24, 2005

(54) MOVEMENT VECTOR GENERATING APPARATUS AND METHOD AND IMAGE ENCODING APPARATUS AND METHOD

(75) Inventor: Tsutomu Takahashi, Tsurugashima (JP)

(73) Assignee: Pioneer Electronic Corporation, Tokyo-to (JP)

(*) Notice: Subject to any disclaimer, the term of this patent is extended or adjusted under 35 U.S.C. 154(b) by 0 days.

(21) Appl. No.: 09/271,905

(22) Filed: Mar. 18, 1999

(30) Foreign Application Priority Data

Mar. 20, 1998 (JP) ........................................ P10-092673

(51) Int. Cl.[7] ............................................. H04N 7/12
(52) U.S. Cl. ............. 375/240.16; 375/240; 375/240.01; 375/240.12; 375/240.17
(58) Field of Search ....................... 375/240.16, 240.17, 375/240, 240.01, 240.12; 348/699, 208

(56) References Cited

U.S. PATENT DOCUMENTS

| | | | | |
|---|---|---|---|---|
| 5,488,419 A | * | 1/1996 | Hui et al. ............... | 375/240.17 |
| 5,576,772 A | * | 11/1996 | Kondo ........................ | 348/699 |
| 5,701,164 A | * | 12/1997 | Kato .......................... | 348/699 |
| 5,835,138 A | * | 11/1998 | Kondo ........................ | 348/208 |
| 5,838,391 A | * | 11/1998 | Kim ........................... | 348/699 |
| 5,872,604 A | * | 2/1999 | Ogura ......................... | 348/699 |

FOREIGN PATENT DOCUMENTS

JP          09-074569    *  3/1997      ............ H04N/7/32

* cited by examiner

Primary Examiner—Allen Wong
(74) Attorney, Agent, or Firm—Nixon & Vanderhye

(57) ABSTRACT

A movement vector generating apparatus generates a movement vector for a movement compensation by means of an inter-frame prediction, when encoding a preset image information including an image of a plurality of frames by using the movement compensation. The movement vector generating apparatus is provided with a plurality of generating devices each for generating the movement vector corresponding to a search range and a search accuracy between one frame and another frame, for each pixel block e.g., each macro block which is located within said one frame respectively in the image information and includes a plurality of pixels, the generating devices respectively using search ranges different from each other and search accuracies different from each other. The movement vector generating apparatus is also provided with a selecting device for selecting one of movement vectors generated by the generating devices, in accordance with characteristics of the image in said each pixel block, and then outputting the selected movement vector corresponding to said each pixel block.

11 Claims, 8 Drawing Sheets

FIG. 9 soccer

| bit-rate [Mbps] | ENTIRE SEARCH [dB] | HIERARCHY SEARCH [dB] | ADAPTATION SWITCH [dB] |
|---|---|---|---|
| 15 | I: 29.995<br>P: 27.362<br>B: 27.860<br>Total: 27.832<br>(−0.304) | I: 30.559<br>P: 27.728<br>B: 28.023<br>Total: 28.070<br>(−0.066) | I: 30.422<br>P: 27.725<br>B: 28.131<br>Total: 28.136<br>(best) |
| 20 | I: 31.340<br>P: 28.285<br>B: 28.379<br>Total: 28.498<br>(−0.235) | I: 31.635<br>P: 28.510<br>B: 28.496<br>Total: 28.552<br>(−0.081) | I: 31.618<br>P: 28.525<br>B: 28.608<br>Total: 28.733<br>(best) |
| 30 | I: 32.982<br>P: 29.605<br>B: 29.096<br>Total: 29.406<br>(−0.164) | I: 33.121<br>P: 29.726<br>B: 29.164<br>Total: 29.490<br>(−0.080) | I: 33.140<br>P: 29.749<br>B: 29.267<br>Total: 29.570<br>(best) |

TABLE (a)

FIG. 10 horse race

| bit-rate [Mbps] | ENTIRE SEARCH [dB] | HIERARCHY SEARCH [dB] | ADAPTATION SWITCH [dB] |
|---|---|---|---|
| 15 | I: 34.473<br>P: 31.805<br>B: 32.014<br>Total: 32.083<br>(−0.491) | I: 35.094<br>P: 32.330<br>B: 32.465<br>Total: 32.561<br>(−0.013) | I: 35.054<br>P: 32.278<br>B: 32.506<br>Total: 32.574<br>(best) |
| 20 | I: 36.017<br>P: 32.857<br>B: 32.593<br>Total: 32.825<br>(−0.319) | I: 36.340<br>P: 33.113<br>B: 32.892<br>Total: 33.114<br>(−0.030) | I: 36.342<br>P: 33.098<br>B: 32.940<br>Total: 33.144<br>(best) |
| 30 | I: 37.582<br>P: 34.143<br>B: 33.251<br>Total: 33.668<br>(−0.166) | I: 37.778<br>P: 34.245<br>B: 33.383<br>Total: 33.795<br>(−0.039) | I: 37.801<br>P: 34.246<br>B: 33.435<br>Total: 33.834<br>(best) |

TABLE (b)

MOVEMENT VECTOR GENERATING APPARATUS AND METHOD AND IMAGE ENCODING APPARATUS AND METHOD

BACKGROUND OF THE INVENTION

1. Field of the Invention

The present invention relates to a movement vector generating apparatus and an image encoding apparatus, for generating a movement vector corresponding to a movement compensation when the movement compensation involving an inter-frame prediction represented by a so-called MPEG (Moving Picture Experts Group) method is executed to compress and encode image information.

2. Description of the Related Art

A so-called movement compensating process is used in an image encoding process, such as the above-mentioned MPEG method and the like.

In this movement compensating process, at first, an image to be encoded is divided into pixel blocks each including a predetermined number of pixels which is set in advance (e.g., divided into macro blocks in the case of the MPEG method). Then, an absolute value of a difference between each pixel within each pixel block and the corresponding pixel within any one frame located forward or backward on a time axis is calculated. Then, the sum is obtained by summing up the absolute values in all pixels within the pixel block. Then, a spatial position of the image, in which the above-mentioned sum of the absolute values becomes minimum is determined (i.e., the spatial position of the image which is located the closest to the image within the pixel block and belongs to any one frame located forward or backward on the time axis).

Then, the relationship between the pixel block and the closest image thereto is defined as a movement vector. Then, this movement vector is encoded as information representing the image within any one frame located forward or backward on the time axis. Accordingly, the image information can be encoded with compressing a sufficient amount of the information to be actually encoded.

In the above mentioned movement compensating process, when the closest image to the pixel block to be encoded is searched within any one frame located forward or backward on the time axis, a search range and a search accuracy within the frame are common for all the pixel blocks within the image information to be encoded.

This search of the movement vector needs a vast amount of calculation.

Therefore, if the searching process is simplified so as to reduce the calculation amount in the case of using the uniform search range and search accuracy for all the pixel blocks, the exact movement vector cannot be determined, which results in a deterioration of the image quality after the decoding operation, which is a problem.

On the other hand, although a uniform enlargement of the search range is effective in order to improve the image quality, with respect to an image having the heavy movement as a whole image of a single frame (for example, an image photographed when a camera photographing the image is moving (panning)), the calculation amount is further increased, which is also a problem.

As a countermeasure for this, the uniform enlargement of the search range for a slender (little) movement causes the calculation amount to be increased. That is, a proper vector calculation cannot be performed, depending on the characteristic of the image information. This results in the problem of the deterioration of the image quality or the unnecessary increase of the calculation amount.

SUMMARY OF THE INVENTION

The present invention is proposed in view of the above mentioned problems. It is therefore an object of the present invention to provide a vector generating apparatus, a vector generating method, an image encoding apparatus having such a vector generating apparatus, and an image encoding method including such a vector generating method, which can properly generate a movement vector in response to the characteristics of an image to be encoded without deteriorating the quality of the image.

The above object of the present invention can be achieved by a movement vector generating apparatus for generating a movement vector for a movement compensation by means of an inter-frame prediction, when encoding a preset image information including an image of a plurality of frames by using the movement compensation. The movement vector generating apparatus is provided with: a plurality of generating devices each for generating the movement vector corresponding to a search range and a search accuracy between one frame and another frame, for each pixel block e.g., each macro block which is located within said one frame respectively in the image information and includes a plurality of pixels, the generating devices respectively using search ranges different from each other and search accuracies different from each other; and a selecting device for selecting one of movement vectors generated by the generating devices, in accordance with characteristics of the image in said each pixel block, and then outputting the selected movement vector corresponding to said each pixel block.

According to the movement vector generating apparatus of the present invention, the movement vector corresponding to the search range and the search accuracy between one frame and another frame are generated for each pixel block by each of the generating devices. At this time, the generating devices respectively using the search ranges different from each other and the search accuracies different from each other. Then, one of movement vectors generated by the generating devices is selected by the selecting device, in accordance with characteristics of the image in each pixel block. Then, the selected movement vector corresponding to each pixel block is outputted from the selecting device.

Accordingly, since the movement vector is selected in accordance with the characteristics of the image in each pixel block which is to be encoded by using the movement vectors generated with the search ranges and the search accuracies different from each other for each pixel block, it is possible to generate the movement vector with the search range and the search accuracy appropriate for the image in each pixel block. Therefore, by using the movement vector generated by the present invention when encoding the image information, it is possible to encode the image information at a higher quality as compared with the case that the movement vector is generated with the fixed search range and search accuracy.

In one aspect of the movement vector generating apparatus of the present invention, the generating devices include: a first generator for generating a first movement vector, with a preset first range as the search range; and a second generator for generating a second movement vector at the search accuracy lower than that of the first movement vector, with a preset second range wider than the first range as the search range.

According to this aspect, in the generating device, the first movement vector is generated with the first range as the search range by the first generator. On the other hand, the second movement vector is generated by the second generator at the search accuracy lower than that of the first movement vector with the second range wider than the first range as the search range.

Accordingly, it is possible to generate the movement vector with the search range and the search accuracy appropriate for the image in each pixel block.

In another aspect of the movement vector generating apparatus of the present invention, the selecting device outputs the second movement vector as the selected movement vector if a length of the second movement vector is a length beyond the search range in the first generating device, and outputs the first movement vector as the selected movement vector if the length of the second movement vector is a length belonging to the search range in the first generating device.

According to this aspect, if the length of the second movement vector is a length beyond the search range in the first generating device, the second movement vector is outputted as the selected movement vector by the selecting device. Alternatively, if the length of the second movement vector is a length belonging to the search range in the first generating device, the first movement vector is outputted as the selected movement vector by the selecting device.

Accordingly, if the movement of the image is fine or minute in one pixel block, the movement vector can be generated at the high accuracy. On the other hand, if the movement of the image is large in one pixel block, the vector can be generated with the large search range.

In another aspect of the movement vector generating apparatus of the present invention, the selecting device is provided with: a first adding device for adding together absolute values of differences between respective one of the pixels in the pixel block and its corresponding pixel in the frame targeted by the movement compensation, as for all of the pixels in the pixel block, in the first generating device, to generate a first absolute value sum; a second adding device for adding together absolute values of differences between respective one of the pixels in the pixel block and its corresponding pixel in the frame targeted by the movement compensation, as for all of the pixels in the pixel block, in the second generating device, to generate a second absolute value sum; and a standardizing device for standardizing the generated first and second absolute value sums, respectively, the selecting device comparing the standardized first absolute value sum with the standardized second absolute value sum, and outputting the second movement vector as the selected movement vector if the standardized first absolute value sum is greater than the standardized second absolute value sum.

According to this aspect, in the selecting device, as for all of the pixels in the pixel block in the first generating device, the absolute values of differences between respective one of the pixels in the pixel block and its corresponding pixel in the frame targeted by the movement compensation are added together by the first adding device, so that the first absolute value sum is generated. On the other hand, as for all of the pixels in the pixel block in the second generating device, the absolute values of differences between respective one of the pixels in the pixel block and its corresponding pixel in the frame targeted by the movement compensation are added together by the second adding device, so that the second absolute value sum is generated. Then, the generated first and second absolute value sums are respectively standardized by the standardizing device. Then, the standardized first absolute value sum is compared with the standardized second absolute value sum by the selecting device. As a result of the comparison, if the standardized first absolute value sum is greater than the standardized second absolute value sum, the second movement vector is outputted as the selected movement vector from the selecting device.

Accordingly, it is possible to generate the movement vector such that the absolute value sum is minimized in the wider search range i.e., the movement vector indicates the closer image.

In another aspect of the movement vector generating apparatus of the present invention, the selecting device is provided with: a first adding device for adding together absolute values of differences between respective one of the pixels in the pixel block and its corresponding pixel in the frame targeted by the movement compensation, as for all of the pixels in the pixel block, in the first generating device, to generate a first absolute value sum; a second adding device for adding together absolute values of differences between respective one of the pixels in the pixel block and its corresponding pixel in the frame targeted by the movement compensation, as for all of the pixels in the pixel block, in the second generating device, to generate a second absolute value sum; and a standardizing device for standardizing the generated first and second absolute value sums, respectively, the selecting device comparing the standardized first absolute value sum with the standardized second absolute value sum, outputting the first movement vector as the selected movement vector if a difference between the standardized first absolute value sum and the standardized second absolute value sum is not greater than a predetermined threshold which is set in advance to detect a difference between the first movement vector and the second movement vector at a high accuracy, and outputting the second movement vector as the selected movement vector if the difference between the standardized first absolute value sum and the standardized second absolute value sum is greater than the predetermined threshold.

According to this aspect, in the selecting device, as for all of the pixels in the pixel block in the first generating device, the absolute values of differences between respective one of the pixels in the pixel block and its corresponding pixel in the frame targeted by the movement compensation are added together by the first adding device, so that the first absolute value sum is generated. On the other hand, as for all of the pixels in the pixel block in the second generating device, the absolute values of differences between respective one of the pixels in the pixel block and its corresponding pixel in the frame targeted by the movement compensation are added together by the second adding device, so that the second absolute value sum is generated. Then, the generated first and second absolute value sums are respectively standardized by the standardizing device. Then, the standardized first absolute value sum is compared with the standardized second absolute value sum by the selecting device. As a result of the comparison, if the difference between the standardized first absolute value sum and the standardized second absolute value sum is not greater than the threshold, the first movement vector is outputted as the selected movement vector from the selecting device. Alternatively, if the difference between the standardized first absolute value sum and the standardized second absolute value sum is greater than the threshold, the second movement vector is outputted as the selected movement vector from the selecting device.

Accordingly, it is possible to generate the movement vector by predominantly selecting one of the first and second movement vectors which has the higher accuracy and generate, even if the difference between the standardized first absolute value sum and the standardized second absolute value sum is small.

In another aspect of the movement vector generating apparatus of the present invention, the selecting device outputs one of the first and second movement vectors which is closer to the selected movement vector corresponding to another pixel block located adjacent to one pixel block as the selected movement vector corresponding to said one pixel block from which the first movement vector and the second movement vector are generated.

According to this aspect, one of the first and second movement vectors which is closer to the selected movement vector corresponding to another pixel block located adjacent to one pixel block is outputted by the selecting device as the selected movement vector corresponding to one pixel block.

Accordingly, it is possible to generate the movement vector in consideration with the mutual relationship between the pixel blocks by using the fact that the approximate movement vectors are generated between the macro blocks adjacent to each other in many cases.

The above object of the present invention can be also achieved by an image encoding apparatus provided with (a) the above described movement vector generating apparatus of the present invention, (b) a compensating device for performing the movement compensation on the basis of the selected movement vector outputted from the selecting device, to output a compensation signal, and (c) an encoding device for encoding the image information on the basis of the compensation signal.

According to the image encoding apparatus of the present invention, the selected movement vector is outputted from the above described movement vector generating apparatus of the present invention. Then, on the basis of this selected movement vector, the movement compensation is performed by compensating device, and the compensation signal is outputted therefrom. Then, on the basis of this compensation signal, the image information is encoded by the encoding device.

Accordingly, since the movement compensation and the image encoding process are performed by use of the movement vector generated with the appropriate search range and search accuracy in correspondence with the image in each pixel block, it is possible to encode the image information with a higher accuracy as compared with the case that the movement vector is generated with the fixed search range and search accuracy.

The above object of the present invention can be also achieved by a movement vector generating method of generating a movement vector for a movement compensation by means of an inter-frame prediction, when encoding a preset image information including an image of a plurality of frames by using the movement compensation. The movement vector generating method is provided with: a plurality of generating processes each of generating the movement vector corresponding to a search range and a search accuracy between one frame and another frame, for each pixel block e.g., each macro block which is located within said one frame respectively in the image information and includes a plurality of pixels, the generating processes respectively using search ranges different from each other and search accuracies different from each other; and a selecting process of selecting one of movement vectors generated by the generating processes, in accordance with characteristics of the image in said each pixel block, and then outputting the selected movement vector corresponding to said each pixel block.

According to the movement vector generating method of the present invention, the movement vector corresponding to the search range and the search accuracy between one frame and another frame are generated for each pixel block by each of the generating process. At this time, the generating process respectively using the search ranges different from each other and the search accuracies different from each other. Then, one of movement vectors generated by the generating process is selected by the selecting process, in accordance with characteristics of the image in each pixel block. Then, the selected movement vector corresponding to each pixel block is outputted from the selecting process.

Accordingly, since the movement vector is selected in accordance with the characteristics of the image in each pixel block which is to be encoded by using the movement vectors generated with the search ranges and the search accuracies different from each other for each pixel block, it is possible to generate the movement vector with the search range and the search accuracy appropriate for the image in each pixel block. Therefore, by using the movement vector generated by the present invention when encoding the image information, it is possible to encode the image information at a higher quality as compared with the case that the movement vector is generated with the fixed search range and search accuracy.

In one aspect of the movement vector generating method of the present invention, the generating processes include: a first generating process of generating a first movement vector, with a preset first range as the search range; and a second generating process of generating a second movement vector at the search accuracy lower than that of the first movement vector, with a preset second range wider than the first range as the search range.

According to this aspect, in the generating process, the first movement vector is generated with the first range as the search range by the first generating process. On the other hand, the second movement vector is generated by the second generating process at the search accuracy lower than that of the first movement vector with the second range wider than the first range as the search range.

Accordingly, it is possible to generate the movement vector with the search range and the search accuracy appropriate for the image in each pixel block.

In another aspect of the movement vector generating method of the present invention, the selecting process outputs the second movement vector as the selected movement vector if a length of the second movement vector is a length beyond the search range in the first generating process, and outputs the first movement vector as the selected movement vector if the length of the second movement vector is a length belonging to the search range in the first generating process.

According to this aspect, if the length of the second movement vector is a length beyond the search range in the first generating process, the second movement vector is outputted as the selected movement vector by the selecting process. Alternatively, if the length of the second movement vector is a length belonging to the search range in the first generating process, the first movement vector is outputted as the selected movement vector by the selecting process.

Accordingly, if the movement of the image is fine or minute in one pixel block, the movement vector can be generated at the high accuracy. On the other hand, if the movement of the image is large in one pixel block, the vector can be generated with the large search range.

In another aspect of the movement vector generating method of the present invention, the selecting process is provided with: a first adding process of adding together absolute values of differences between respective one of the pixels in the pixel block and its corresponding pixel in the frame targeted by the movement compensation, as for all of the pixels in the pixel block, in the first generating process, to generate a first absolute value sum; a second adding process of adding together absolute values of differences between respective one of the pixels in the pixel block and its corresponding pixel in the frame targeted by the movement compensation, as for all of the pixels in the pixel block, in the second generating process, to generate a second absolute value sum; and a standardizing process of standardizing the generated first and second absolute value sums, respectively, the selecting process comparing the standardized first absolute value sum with the standardized second absolute value sum, and outputting the second movement vector as the selected movement vector if the standardized first absolute value sum is greater than the standardized second absolute value sum.

According to this aspect, in the selecting process, as for all of the pixels in the pixel block in the first generating process, the absolute values of differences between respective one of the pixels in the pixel block and its corresponding pixel in the frame targeted by the movement compensation are added together by the first adding process, so that the first absolute value sum is generated. On the other hand, as for all of the pixels in the pixel block in the second generating process, the absolute values of differences between respective one of the pixels in the pixel block and its corresponding pixel in the frame targeted by the movement compensation are added together by the second adding process, so that the second absolute value sum is generated. Then, the generated first and second absolute value sums are respectively standardized by the standardizing process. Then, the standardized first absolute value sum is compared with the standardized second absolute value sum by the selecting process. As a result of the comparison, if the standardized first absolute value sum is greater than the standardized second absolute value sum, the second movement vector is outputted as the selected movement vector from the selecting process.

Accordingly, it is possible to generate the movement vector such that the absolute value sum is minimized in the wider search range i.e., the movement vector indicates the closer image.

In another aspect of the movement vector generating method of the present invention, the selecting process is provided with: a first adding process of adding together absolute values of differences between respective one of the pixels in the pixel block and its corresponding pixel in the frame targeted by the movement compensation, as for all of the pixels in the pixel block, in the first generating process, to generate a first absolute value sum; a second adding process of adding together absolute values of differences between respective one of the pixels in the pixel block and its corresponding pixel in the frame targeted by the movement compensation, as for all of the pixels in the pixel block, in the second generating process, to generate a second absolute value sum; and a standardizing process of standardizing the generated first and second absolute value sums, respectively, the selecting process comparing the standardized first absolute value sum with the standardized second absolute value sum, outputting the first movement vector as the selected movement vector if a difference between the standardized first absolute value sum and the standardized second absolute value sum is not greater than a predetermined threshold which is set in advance to detect a difference between the first movement vector and the second movement vector at a high accuracy, and outputting the second movement vector as the selected movement vector if the difference between the standardized first absolute value sum and the standardized second absolute value sum is greater than the predetermined threshold.

According to this aspect, in the selecting process, as for all of the pixels in the pixel block in the first generating process, the absolute values of differences between respective one of the pixels in the pixel block and its corresponding pixel in the frame targeted by the movement compensation are added together by the first adding process, so that the first absolute value sum is generated. On the other hand, as for all of the pixels in the pixel block in the second generating process, the absolute values of differences between respective one of the pixels in the pixel block and its corresponding pixel in the frame targeted by the movement compensation are added together by the second adding process, so that the second absolute value sum is generated. Then, the generated first and second absolute value sums are respectively standardized by the standardizing process. Then, the standardized first absolute value sum is compared with the standardized second absolute value sum by the selecting process. As a result of the comparison, if the difference between the standardized first absolute value sum and the standardized second absolute value sum is not greater than the threshold, the first movement vector is outputted as the selected movement vector from the selecting process. Alternatively, if the difference between the standardized first absolute value sum and the standardized second absolute value sum is greater than the threshold, the second movement vector is outputted as the selected movement vector from the selecting process.

Accordingly, it is possible to generate the movement vector by predominantly selecting one of the first and second movement vectors which has the higher accuracy and generate, even if the difference between the standardized first absolute value sum and the standardized second absolute value sum is small.

In another aspect of the movement vector generating method of the present invention, the selecting process outputs one of the first and second movement vectors which is closer to the selected movement vector corresponding to another pixel block located adjacent to one pixel block as the selected movement vector corresponding to said one pixel block from which the first movement vector and the second movement vector are generated.

According to this aspect, one of the first and second movement vectors which is closer to the selected movement vector corresponding to another pixel block located adjacent to one pixel block is outputted by the selecting process as the selected movement vector corresponding to one pixel block.

Accordingly, it is possible to generate the movement vector in consideration with the mutual relationship between the pixel blocks by using the fact that the approximate movement vectors are generated between the macro blocks adjacent to each other in many cases.

The above object of the present invention can be also achieved by an image encoding method provided with (a) the above described movement vector generating method of the present invention, (b) a compensating process of performing the movement compensation on the basis of the selected movement vector outputted from the selecting process, to output a compensation signal, and (c) an encoding process of encoding the image information on the basis of the compensation signal.

According to the image encoding method of the present invention, the selected movement vector is outputted from the above described movement vector generating method of the present invention. Then, on the basis of this selected movement vector, the movement compensation is performed by compensating process, and the compensation signal is outputted therefrom. Then, on the basis of this compensation signal, the image information is encoded by the encoding process.

Accordingly, since the movement compensation and the image encoding process are performed by use of the movement vector generated with the appropriate search range and search accuracy in correspondence with the image in each pixel block, it is possible to encode the image information with a higher accuracy as compared with the case that the movement vector is generated with the fixed search range and search accuracy.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 9 is a TABLE (a) indicating a bit rate with respect to the entire search, the hierarchy search and the adaptation switch respectively, for an image of "succer"; and FIG. 10 is a TABLE (b) indicating a bit rate with respect to the entire search, the hierarchy search and the adaptation switch respectively, for an image of "horse race".

DESCRIPTION OF THE PREFERRED EMBODIMENTS

Preferred embodiments of the present invention will be described below with reference to the drawings. The respective embodiments described below are embodiments in which the present invention is applied to a movement compensating process in an image encoding apparatus which compresses and encodes image information digitized for each pixel constituting each frame by using the above-mentioned MPEG method.

(I) Principle of Movement Compensating Process

At first, the principle of the movement compensating process according to the present invention is exemplified and explained with reference to FIG. 1, before actually explaining the embodiments.

Figure 1:
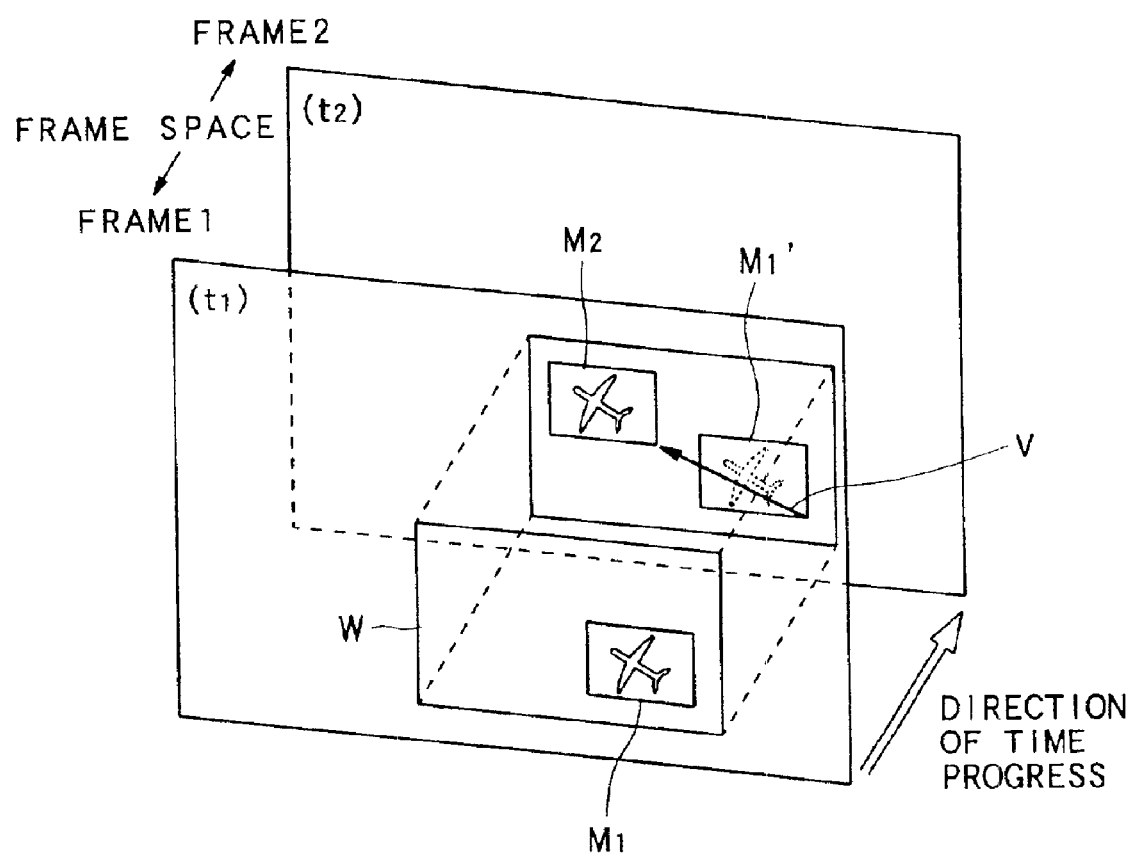
FIG. 1 is a diagram showing the principle of a movement compensation.

At first, as shown in FIG. 1, it is assumed that there are two frames (in the case of FIG. 1, a frame 1 and a frame 2) adjacently to each other on a time axis within image information to be encoded, and between these frames, for example, an image within a macro block M1 as an image block located within the frame 1 shown FIG. 1 at a time t1 is moved to a position illustrated as a macro block M2 in FIG. 1 within the frame 2 at a time t2, because of the change of the image information from the time t1 to the time t2.

At this time, in the movement compensating process in the MPEG method, a common search range W between the frame 1 and the frame 2 is firstly established, and then, a macro block within the frame 2 having the same image (the same pattern) as that within the macro block M1 within the frame 1 is searched in the range W.

In the example shown in FIG. 1, the macro block to be searched is the macro block M2 on the frame 2. In this case, the movement during the time period (from the time t1 to the time t2) of the image located within the macro block M1 (i.e., the movement from the position of the macro block M1 to the position of the macro block M2) is represented by a movement amount on a two-dimensional coordinate is referred to as a movement vector V. The movement compensating process according to the MPEG method does not encode both of the frame 1 and the frame 2 by using both of the macro block M1 and the macro block M2 as they are. Namely, instead of encoding the whole macro block M2, the movement compensating process encodes the movement vector V and the macro block M1 on the frame 1, as information indicating the macro block M2 (in this way, the manner of using the movement vector to predict the change of the image in its adjacent frame is referred to as an inter-frame prediction).

By this process, the information amount can be extremely reduced to encode the frame 1 and the frame 2, as compared with the case in which the respective macro blocks are encoded as they are.

In the present invention, when generating this movement vector V, an area of the search range W and the search accuracy to generate the movement vector V are changed in accordance with the characteristics of the image (e.g., the heavy or little movement, the light and shade, or the like) within the macro block for each macro block to be encoded. Then, the movement vector is generated.

(II) First Embodiment

The first embodiment according to the present invention including the movement compensating process will be described below with reference to FIG. 2 to FIG. 4B.

Figure 2:
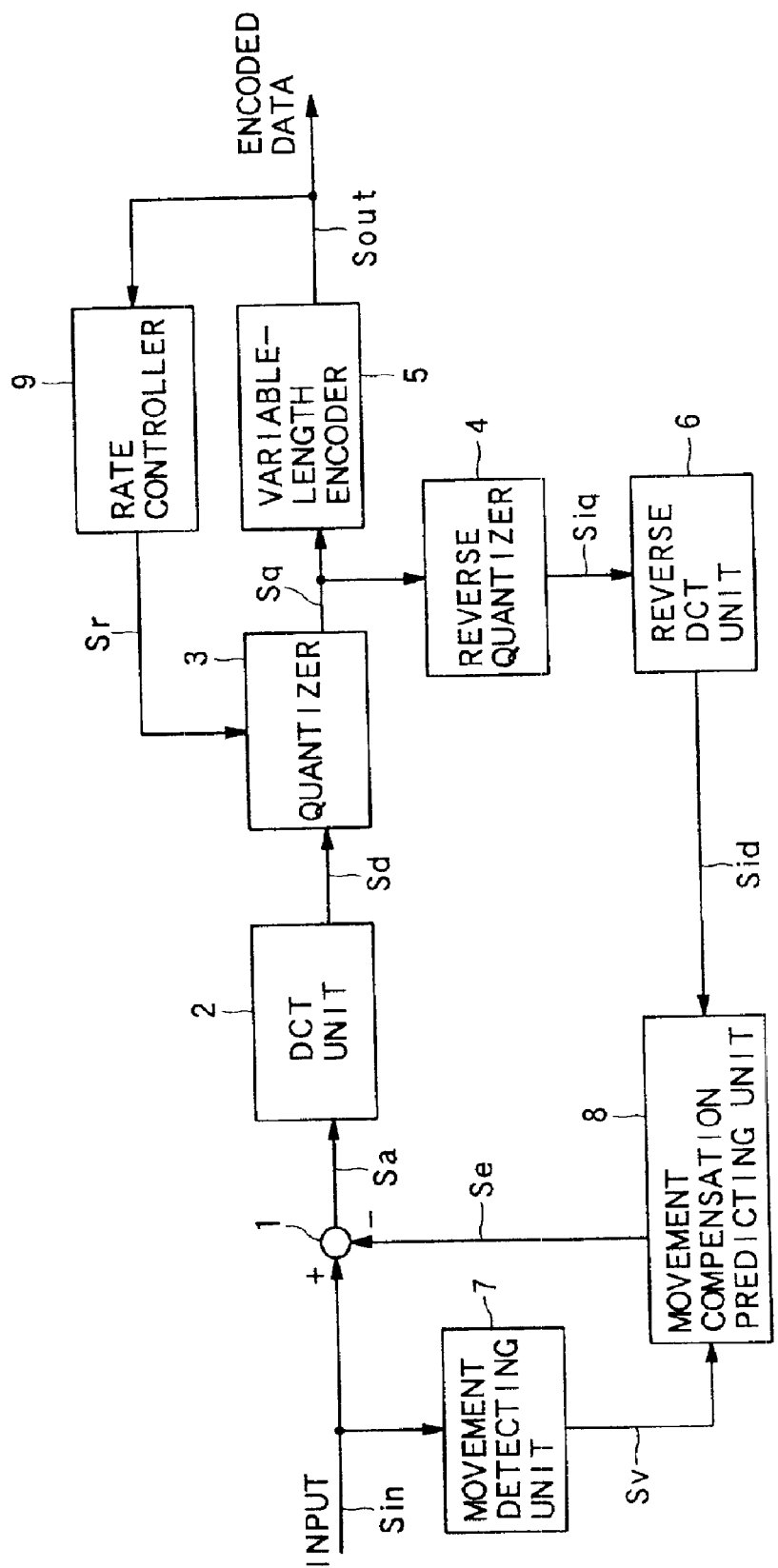
FIG. 2 is a block diagram showing a schematic configuration of an image encoding apparatus as a first embodiment of the present invention.

As shown in FIG. 2, an image encoding apparatus by means of the MPEG method in the first embodiment is provided with an adder 1, a DCT (Discrete Cosine Transform) unit 2, a quantizer 3, a reverse quantizer 4, a variable-length encoder 5 serving as an encoding device, a reverse DCT unit 6, a movement detecting unit 7, a movement compensation predicting unit 8 serving as a compensating device and a rate controller 9.

The whole operation will be described below.

An input signal Sin (digitized for each pixel constituting each frame) composed of a plurality of frame images inputted to the image encoding apparatus S from the external is inputted to the movement detecting unit 7 and also inputted to the adder 1.

Then, the movement detecting unit 7 calculates the movement vector V for each frame within the input signal Sin, by using a method described later. A corresponding vector signal Sv is outputted to the movement compensation predicting unit 8.

On the other hand, a compensation signal Se from the movement compensation predicting unit 8 is subtracted from the input signal Sin outputted to the adder 1, by the adder 1. Then, the subtracted signal is outputted to the DCT unit 2 as a subtraction signal Sa.

Next, the DCT unit 2 performs on the subtraction signal Sa the DCT (Discrete Cosine Transform) for compressing an amount of information by using the well known technique, and then outputs it to the quantizer 3 as a conversion signal Sd.

Then, the quantizer 3 quantizes the conversion signal Sd so as to adapt it to a bit rate indicated by a rate signal Sr described later, and then generates a quantization signal Sq, and further outputs it to the variable-length encoder 5 and the reverse quantizer 4.

Next, the reverse quantizer 4 performs a reversely quantizing process on the quantization signal Sq, and then generates a reverse quantization signal Siq, and further outputs it to the reverse DCT unit 6.

Then, the reverse DCT unit 6 performs on the reverse quantization signal Siq the reverse DCT (Reverse Discrete Cosine Transform) by using the well known technique, and then outputs it to the movement compensation predicting unit 8 as a reverse conversion signal Sid.

After that, the movement compensation predicting unit 8 executes the movement compensating process using the inter-frame prediction, in accordance with the reverse conversion signal Sid and the movement vector V included in the vector signal Sv, and then generates the compensation signal Se for compressing the information amount, and further outputs it to the adder 1.

On the other hand, the variable-length encoder 5 performs a variable-length encoding process on the quantization signal Sq, and outputs to the external an output signal Sout that is a signal in which the original input signal Sin is compressed and encoded by using the MPEG method.

At this time, the rate controller 9 generates the rate signal Sr for optimizing the bit rate in the quantizing operation of the quantizer 3, in accordance with the output signal Sout, and then outputs the rate signal Sr to the quantizer 3.

The detailed configuration and the operations of the movement detecting unit 7 according to the present invention will be described below with reference to FIGS. 3A, 3B, 4A and 4B.

Figure 3A:
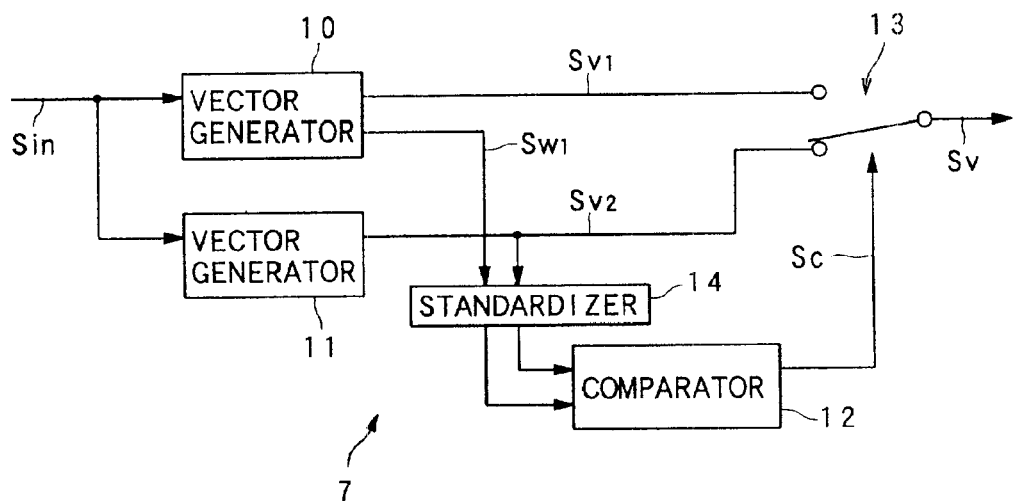
FIG. 3A is a block diagram showing a detailed structure of a movement detecting unit in the first embodiment.

As shown in FIG. 3A, the movement detecting unit 7 is provided with: a vector generator 10 serving as a generating device, a first generating device and a first adding device; a vector generator 11 serving as a generating device, a second generating device and a second adding device; a comparator 12 serving as a selecting device; a switch 13 serving as a selecting device; and a standardizer 14 serving as a standardizing device.

Operations will be described below.

At first, for each frame in the input signal Sin, the vector generator 10 defines, for example, a horizontal direction±32 pixels and a vertical direction±32 pixels as a search range W1, and then generates a movement vector V1 at a half-pixel accuracy, for all the pixels within the macro block M (that is, executes a so-called entire search), and further outputs a corresponding vector signal Sv1 to one input terminal of the switch 13.

In parallel to the above-mentioned operation, the vector generator 10 generates a range signal Sw1 representing an area of the search range W1, and then outputs the range signal Sw1 to the standardizer 14.

On the other hand, for each frame in the input signal Sin, the vector generator 11 defines, for example, a horizontal direction±128 pixels and a vertical direction±32 pixels as a search range W2, and then generates a movement vector V2 at the half-pixel accuracy, for the remaining pixels after a predetermined number of pixels which is set in advance are thinned out from all the pixels within the macro block M (that is, executes a hierarchy search), and then outputs a corresponding vector signal Sv2 to the other input terminal of the switch 13 and the standardizer 14.

Then, the standardizer 14 performs a standardizing process similar to that of a standardizer 23 described later, on each of the inputted vector signal Sv2 and range signal Sw1, and then outputs the standardized vector signal Sv2 and range signal Sw1 to the comparator 12.

Accordingly, in accordance with the inputted range signal Sw1 and vector signal Sv2, if the length of the generated movement vector V2 is a length exceeding the search range W1 (refer to FIG. 4B), the comparator 12 generates a control signal Sc to control the switch 13 so as to select the vector signal Sv2 corresponding to the movement vector V2, and then outputs the control signal Sc to the switch 13.

On the other hand, if the length of the generated movement vector V2 is a length within the search range W1 (refer to FIG. 4A), the comparator 12 generates the control signal Sc to control the switch 13 so as to select the vector signal Sv1 corresponding to the movement vector V1, and then outputs the control signal Sc to the switch 13.

Accordingly, the switch 13 switches the vector signal Sv1 or Sv2 in accordance with the control signal Sc, and outputs the vector signal Sv corresponding to the movement vector V shown in FIG. 1, to the movement compensation predicting unit 8.

The detailed configuration of the vector generator 11 will be described below with reference to FIG. 3B.

Figure 3B:
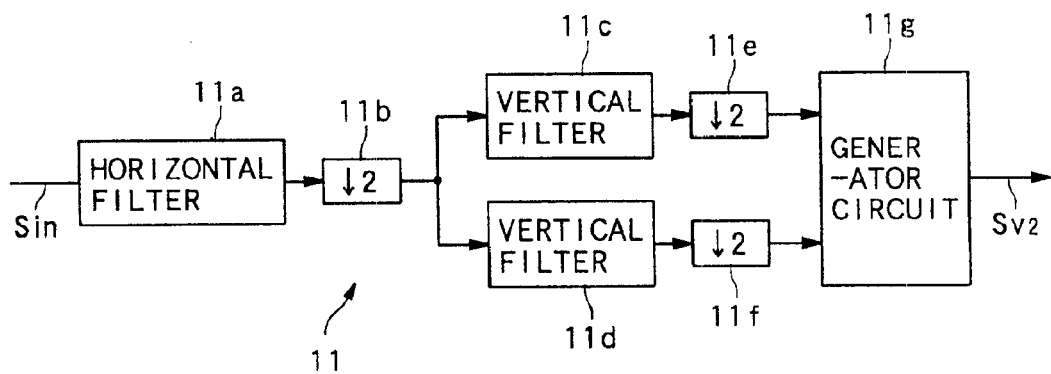
FIG. 3B is a block diagram showing a detailed structure of a vector generating apparatus in the first embodiment.
Figure 4A:
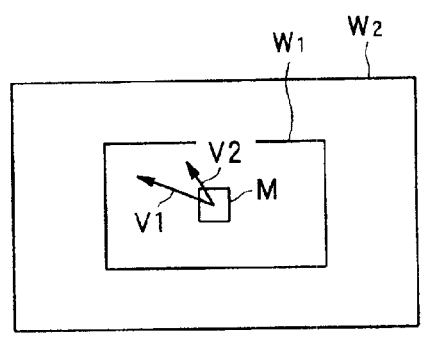
FIG. 4A is a diagram showing a case in which a movement vector generated by a hierarchy search belongs to a search range of an entire search, in a selection of a movement vector in the first embodiment.
Figure 4B:
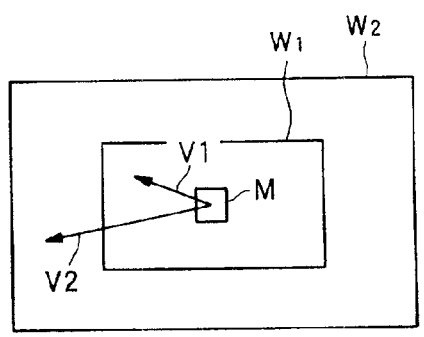
FIG. 4B is a view showing a case in which the movement vector generated by the hierarchy search does not belong to the search range of the entire search, in the selection of the movement vector in the first embodiment.

As shown in FIG. 3B, the vector generator 11 is provided with: a horizontal filter 11a, which limits a horizontal frequency band in the input signal Sin in order to prevent the extreme expansion of a bit interval of the input signal Sin in a horizontal direction after the execution of a later-described horizontal thinning out process; a thinning-out circuit 11b which thins out, every other bit, the bits in the horizontal direction in the input signal Sin after the limitation of the frequency band to thereby halve the number of bits in the horizontal direction, and also separates the signal, after data in the horizontal direction is thinned out, into a first field and a second field within one frame, and then outputs a signal corresponding to the first signal to a vertical filter 11c, and further outputs a signal corresponding to the second field to a vertical filter 11d; the vertical filter 11c which limits a vertical frequency band in the signal corresponding to the first field in order to prevent the extreme expansion of a bit interval in a vertical direction after an execution of a later-described vertically thinning-out process is performed on the signal corresponding to the first filed; a thinning-out circuit 11e which thins out, every other bit, bits in the vertical direction in the signal corresponding to the first field after the limitation of the vertical frequency band to thereby halve the number of bits in the vertical direction, and then outputs it to a generator circuit 11g; the vertical filter 11d which limits a vertical frequency band in the signal corresponding to the second field in order to prevent the extreme expansion of a bit interval in a vertical direction after the later-described vertically thinning out process is performed on the signal that is outputted by the thinning-out circuit 11b and corresponds to the second field; a thinning-out circuit 11f which thins out, every other bit, bits in the vertical direction in the signal corresponding to the second field after the limitation of the vertical frequency band to thereby halve the number of bits in the vertical direction, and then outputs it to the generator circuit 11g; and the generator circuit 11g that performs the above-mentioned hierarchy search on each field in the input signal Sin in which the number of bits in the horizontal direction and the number of bits in the vertical direction are respectively thinned out, and then generates the vector signal Sv2 corresponding to the movement vector V2.

In addition, if one frame in the input signal Sin is composed of, for example, 1920 pixels×1088 pixels in a hi-vision image, one frame is thinned out to 960 pixels×544 pixels, in the hierarchy search of the vector generator 11. The search range W2 is established under this condition. Then, the search of the movement vector is executed.

As mentioned above, according to the process of the movement detecting unit 7 in the first embodiment, the movement vector V corresponding to the characteristics of the image within the macro block M to be encoded is extracted from the movement vectors V1 and V2 generated by making the search ranges different from each other and also making the search accuracies different from each other, with regard to the same single macro block M. Thus, it is possible to generate the movement vector V generated in accordance with the proper search range and search accuracy in response to the image within each macro block.

More concretely, the movement vector V1 can be generated at a high accuracy, for the macro block M in which the movement of the image is minute, and the movement vector V2 can be also generated in a wide search range, for the image block in which the movement of the image is large.

Also, the movement vector generated in accordance with the proper search range and search accuracy in response to the image within each macro block can be generated without excessively increasing the processing amount when generating the movement vector V.

Moreover, the image information can be encoded at a higher image quality, as compared with the case in which the movement vector is generated at the same uniform search range and search accuracy.

(III) Second Embodiment

A second embodiment that is another embodiment of the movement detecting unit according to the present invention will be described below with reference to FIG. 5. In the second embodiment described below, the components of an image encoding apparatus except the movement detecting unit are same as those of the image encoding apparatus S in the first embodiment. Thus, the detailed description thereof are omitted.

In the first embodiment, the area of the search range W1 when carrying out the entire search and the length of the movement vector V2 obtained by carrying out the hierarchy search are compared with each other to thereby generate the movement vector V to be detected. However, in the second embodiment, a sum of absolute values of differences calculated when generating the movement vector V1 and a sum of absolute values calculated when generating the movement vector V2 are compared with each other to thereby generate the movement vector V to be detected.

That is, as shown in FIG. 6, a movement detecting unit 50 according to the second embodiment is provided with vector generators 20 and 21, a comparator 22, a standardizer 23 and the above-mentioned switch 13.

At this time, similarly to the vector generator 10, for each frame in the input signal Sin, the vector generator 20 firstly defines the horizontal direction±32 pixels and the vertical direction±32 pixels as the search range W1, and then carries out the entire search and thereby generates the movement vector V1, and further outputs the corresponding vector signal Sv1 to one input terminal of the switch 13.

In parallel to the above-mentioned operation, the vector generator 20 generates a sum signal Ss1 corresponding to a sum of absolute values of differences calculated when the movement vector V1 is generated, that is, a sum of absolute values in which absolute values of differences between respective one of pixels within the above-mentioned macro block M and the corresponding pixel within a frame (in the case of FIG. 1, the frame 2) targeted by a movement compensation are added to each other, with regard to all the pixels within the macro block M, and then outputs the sum signal Ss1 to the standardizer 23.

On the other hand, similarly to the vector generator 11, for each frame in the input signal Sin, the vector generator 21 firstly defines the horizontal direction±128 pixels and the vertical direction±32 pixels as the search range W2, and then carries out the hierarchy search, and accordingly generates the movement vector V1, and further outputs the corresponding vector signal Sv2 to the other input terminal of the switch 13.

In parallel to the above-mentioned operation, the vector generator 21 generates a sum signal Ss2 corresponding to the sum of the absolute values of the differences calculated when the movement vector V2 is generated, and then outputs the sum signal Ss2 to the standardizer 22.

Then, for each of the inputted sum signals Ss1 and Ss2, the standardizer 23 multiplies, for example, the sum of the absolute values included in the sum signal Ss2 by 4 times, and further outputs the sum of the absolute values included in the sum signal Ss1 as it is. Alternatively, the standardizer 23 outputs the sum of the absolute values included in the sum signal Ss2 as it is, and further performs a so-called standardizing process, such as a process of quartering the sum of the absolute values included in the sum signal Ss1 and other operations, and then outputs the standardized sum signals Ss1, Ss2 to the comparator 22. This process of the standardizer 23 results from the fact that the sum signal Ss1 is four times larger than the sum signal Ss2, in the number of pixels corresponding to each of the sum signals.

Accordingly, if the sum of the absolute values included in the standardized sum signal Ss1 is equal to or less than the sum of the absolute values included in the standardized sum signal Ss2, the comparator 22 generates the control signal Sc to control the switch 13 so as to select the vector signal Sv1 corresponding to the movement vector V1, and then outputs the control signal Sc to the switch 13.

On the other hand, if the sum of the absolute values included in the standardized sum signal Ss1 is greater than the sum of the absolute values included in the standardized sum signal Ss2, the comparator 22 generates the control signal Sc to control the switch 13 so as to select the vector signal Sv2 corresponding to the movement vector V2, and then outputs the control signal Sc to the switch 13.

Accordingly, the switch 13 switches the vector signal Sv1 or Sv2 in accordance with the control signal Sc, and then outputs the vector signal Sv corresponding to the movement vector V shown in FIG. 1, to the movement compensation predicting unit 8.

According to the above-mentioned operations of the movement detecting unit 50 in the second embodiment, the movement vector V can be generated so as to keep the above-mentioned sum of the absolute values to a minimum in the wider search range, namely, so as to indicate the macro block M having the closer image.

In addition, the movement detecting unit 50 in the second embodiment may have a below-described configuration other than the above-mentioned configurations. That is, if the difference between the sum of the absolute values included in the sum signal Ss1 and the sum of the absolute values included in the sum signal Ss2 is equal to or less than a preset predetermined threshold to detect the difference between the movement vector V1 and the movement vector V2 at a high accuracy, the comparator 22 generates the control signal Sc to control the switch 13 so as to select the vector signal Sv1 corresponding to the movement vector V1, and then outputs the control signal Sc to the switch 13. Also, if the difference between the sum of the absolute values included in the sum signal Ss1 and the sum of the absolute values included in the sum signal Ss2 is greater than the predetermined threshold, the comparator 22 generates the control signal Sc to control the switch 13 so as to select the vector signal Sv2 corresponding to the movement vector V2, and then outputs the control signal Sc to the switch 13.

Such a configuration enables the movement vector V with the high accuracy to be generated even if the difference between the above-mentioned sums of the absolute values in the movement vector V1 and the movement vector V2 is minute.

(IV) Third Embodiment

A third embodiment that is another embodiment of the movement detecting unit according to the present invention will be described below with reference to FIG. 6. In the third embodiment described below, the components of an image encoding apparatus except the movement detecting unit are similar to those of the image encoding apparatus S in the first embodiment. Thus, the detailed descriptions thereof are omitted.

In the first embodiment, the area of the search range W1 when the entire search is carried out and the length of the movement vector V2 obtained by executing the hierarchy search are used to generate the movement vector V to be detected. However, in the third embodiment, one of the movement vectors V1 and V2, which is located closer to a pre-generated movement vector Vp corresponding to a macro block positioned in the periphery of the macro block M from which the movement vector V is to be detected is generated as the movement vector V to be detected.

Figure 6A:
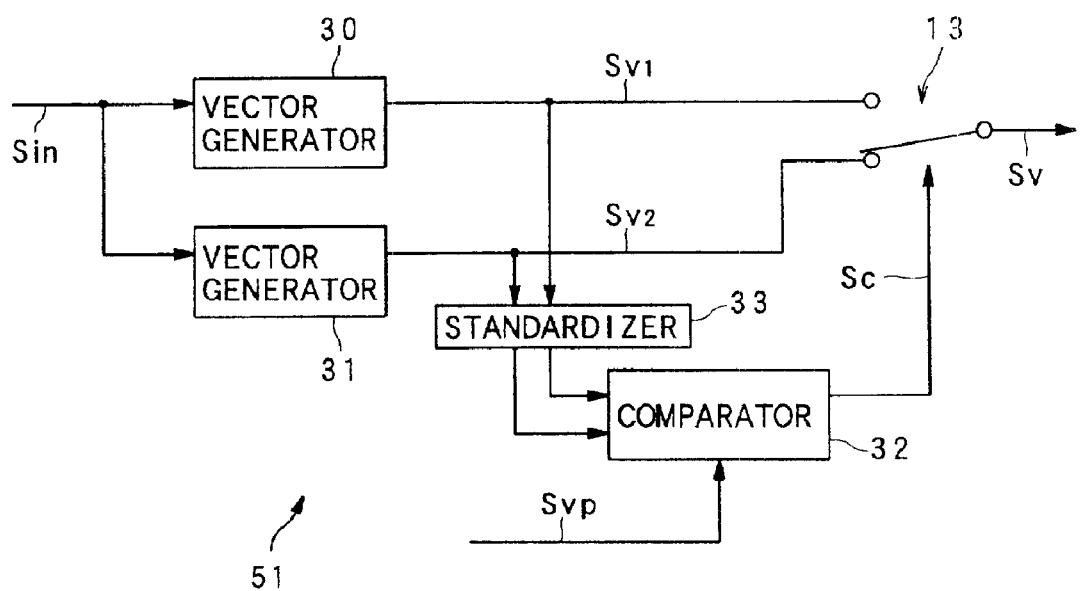
FIG. 6A is a block diagram showing a schematic configuration of a movement detecting unit in a third embodiment.

That is, as shown in FIG. 6A, a movement detecting unit 51 according to the third embodiment is provided with vector generators 30 and 31, a comparator 32, a standardizer 33 and the above-mentioned switch 13.

At this time, similarly to the vector generator 10 or 20, for each frame in the input signal Sin, the vector generator 30 firstly defines the horizontal direction±32 pixels and the vertical direction±32 pixels as the search range W1, and then carries out the above-mentioned entire search, and thereby generates the movement vector V1, and further outputs the corresponding vector signal Sv1 to one input terminal of the switch 13 and the standardizer 33.

On the other hand, similarly to the vector generator 11 or 12, for each frame in the input signal Sin, the vector generator 31 firstly defines the horizontal direction±128 pixels and the vertical direction±32 pixels as the search range W2, and then carries out the above-mentioned hierarchy search, and accordingly generates the movement vector V2, and further outputs the corresponding vector signal Sv2 to the other input terminal of the switch 13 and the standardizer 33.

Figure 5:
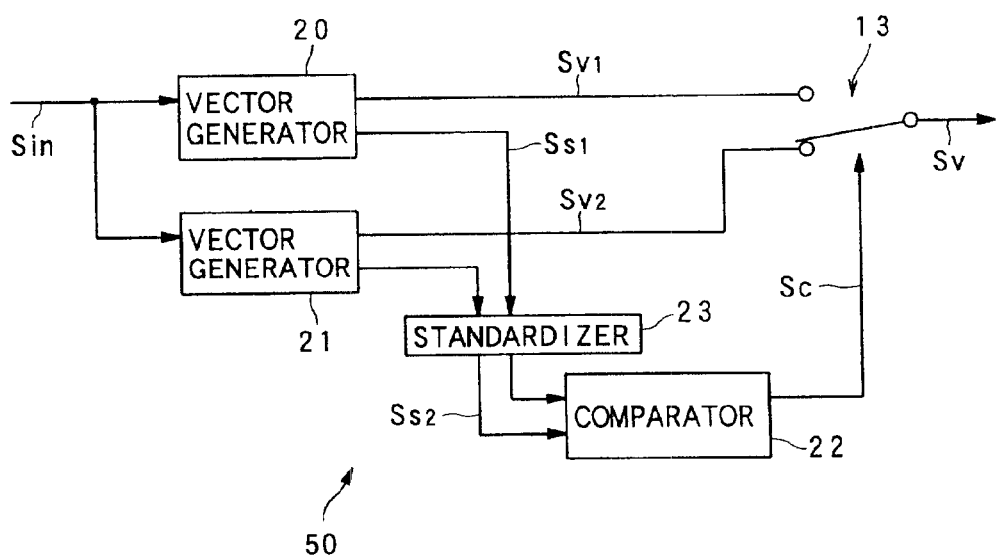
FIG. 5 is a block diagram showing a schematic configuration of a movement detecting unit in a second embodiment of the present invention.

Then, the standardizer 33 performs the standardizing process similar to that of the standardizer 23 in the second embodiment of FIG. 5, on each of the inputted sum signals Ss1 and Ss2, and then outputs the standardized sum signals Ss1 and Ss2 to the comparator 32.

Accordingly, the comparator 32 compares a pre-generated vector signal Svp (which is stored in a memory (not shown) when the movement vector Vp corresponding to the adjacent or peripheral macro block is generated) representing the movement vector Vp corresponding to another macro block positioned in the periphery of the macro block M from which the movement vector is to be calculated (for example, a macro block adjacent or peripheral to the macro block M), with the above-mentioned standardized vector signals Sv1 and Sv2, and then generates the control signal Sc to control the switch 13 so as to select the vector signal corresponding to the movement vector located closer to the movement vector Vp.

Figure 6B:
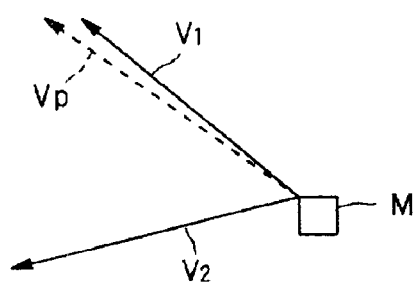
FIG. 6B is a diagram showing the operation thereof.

That is, in a case shown in FIG. 6B, one of the generated movement vectors V1 and V2, which is located closer to the movement vector Vp, is the movement vector V1. Thus, in this case, the comparator 32 generates the control signal Sc to control the switch 13 so as to select the vector signal Sv1 corresponding to the movement vector V1.

Accordingly, the switch 13 selects the moving vector closer to the moving vector Vp as the movement vector V from which the movement vector is to be detected, in accordance with the control signal Sc, and outputs the corresponding vector signal Sv out of the vector signals Sv1 or Sv2 to the movement compensation predicting unit 8.

According to the above-mentioned operations of the movement detecting unit 51 in the third embodiment, by using the fact that the approximate movement vectors are generated between the macro blocks adjacent to each other in many cases, it is possible to consider the relative relationship between the plurality of macro blocks and thereby generate the movement vector V.

(V) Fourth Embodiment

A fourth embodiment that is another embodiment of the movement detecting unit according to the present invention will be described below with reference to FIG. 7. In the fourth embodiment described below, the components of an image encoding apparatus except the movement detecting unit are similar to those of the image encoding apparatus S in the first embodiment. Thus, the detailed descriptions thereof are omitted.

In the above-mentioned first to third embodiments, the movement detecting unit has two vector generators for generating the movement vector. However, other than that, the movement detecting unit may have three or more vector generators which are different from each other in the search range and the search accuracy, as the vector generator, and further utilize the combination of the above-mentioned methods in the first to third embodiments, as the method of generating the final movement vector V.

Figure 7:
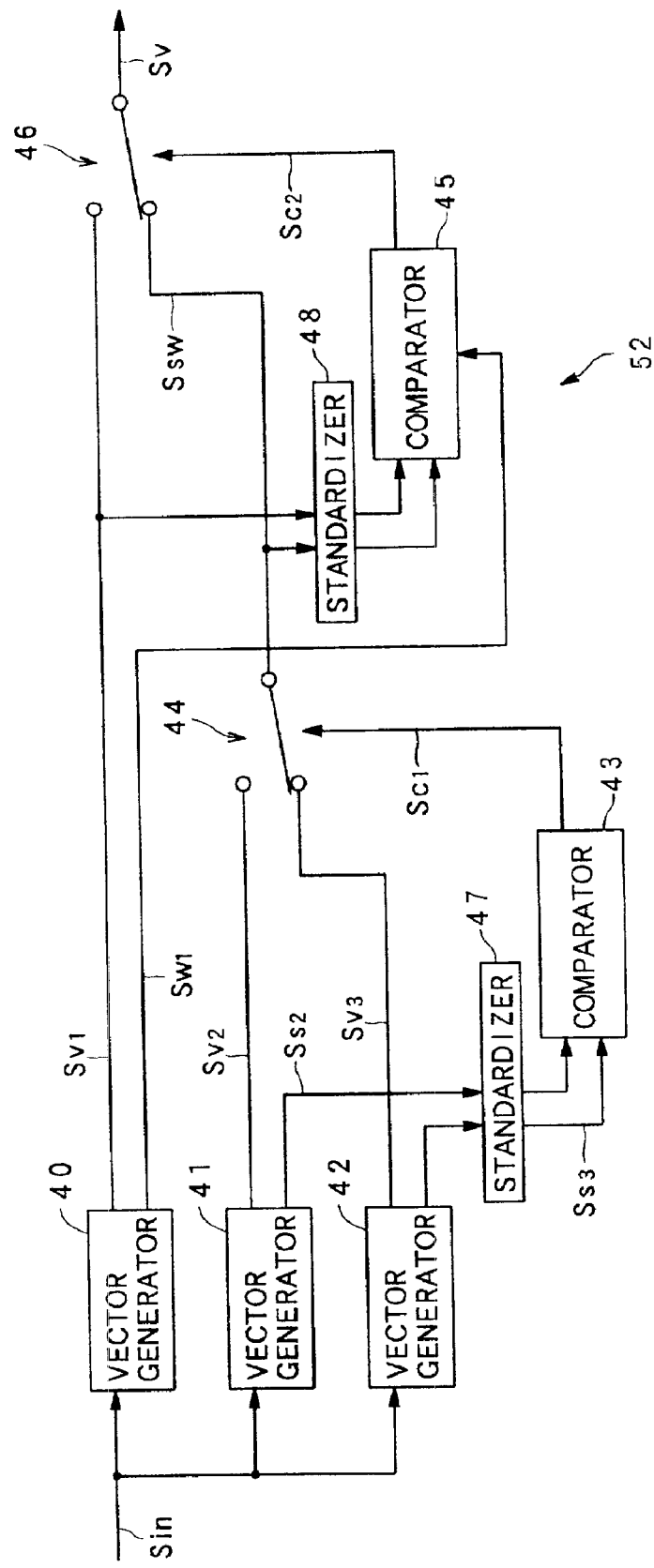
FIG. 7 is a block diagram showing a schematic configuration of a movement detecting unit in a fourth embodiment of the present invention.

That is, for example, in the fourth embodiment shown in FIG. 7, a movement detecting unit 52 is provided with: three vector generators 40 to 42 which are different from each other in the search range and the search accuracy and generate a vector signal Sv1 corresponding to a movement vector V1, a vector signal Sv2 corresponding to a movement vector V2 and a vector signal Sv3 corresponding to a movement vector V3, respectively; comparators 43 and 45, switches 44 and 46, and standardizers 47 and 48.

As for the search range and the search accuracy of each of the vector generators 40 to 42, the vector generator 40 has the narrowest search range, and the vector generator 42 has the widest search range. On the other hand, the vector generator 40 has the highest search accuracy, and the vector generator 42 has the lowest search accuracy.

Then, the vector generator 40 among the three vector generators 40 to 42 outputs the vector signal Sv1 to one input terminal of the switch 46 and also outputs it to the standardizer 48.

In parallel to the above-mentioned operation, the vector generator 40 generates a range signal Sw1 indicating the area of the search range W1 thereof, and then outputs the range signal Sw1 to the comparator 45.

Also, the vector generator 41 generates the vector signal Sv2, and further generates a sum signal Ss2 corresponding to the sum of the absolute values of the above-mentioned differences calculated when the movement vector V2 is generated, and then outputs the sum signal Ss2 to the standardizer 47.

Moreover, the vector generator 42 generates the vector signal Sv3, and further generates a sum signal Ss3 corresponding to the sum of the absolute values of the above-mentioned differences calculated when the movement vector V3 is generated, and then outputs the sum signal Ss3 to the standardizer 47.

Then, the standardizer 47 standardizes the sum signals Ss2 and Ss3, respectively, as mentioned above, and then outputs them to the comparator 43.

Accordingly, if the sum of the absolute values included in the standardized sum signal Ss2 is equal to or less than the sum of the absolute values included in the standardized sum signal Ss3, the comparator 43 generates a control signal Sc1 to control the switch 44 so as to select the vector signal Sv2 corresponding to the movement vector V2, and then outputs the control signal Sc1 to the switch 44.

On the other hand, if the sum of the absolute values included in the standardized sum signal Ss2 is greater than the sum of the absolute values included in the standardized sum signal Ss3, the comparator 43 generates the control signal Sc1 to control the switch 44 so as to select the vector signal Sv3 corresponding to the movement vector V3, and then outputs the control signal Sc1 to the switch 44.

Accordingly, the switch 44 switches the vector signal Sv2 or Sv3 in accordance with the control signal Sc1, and then outputs a selection signal Ssw to the other input terminal of the switch 46, and also outputs it to the standardizer 48.

Then, the standardizer 48 standardizes the vector signal Sv1 and the selection signal Ssw, respectively, as mentioned above, and outputs them to the comparator 45.

By this, in accordance with the inputted range signal Sw1, if the length of the movement vector included in the standardized selection signal Ssw is a length beyond the search range W1, the comparator 45 generates a control signal Sc2 to control the switch 46 so as to select the selection signal Ssw corresponding to the pertinent movement vector, and then outputs the control signal Sc2 to the switch 46.

On the other hand, if the length of the movement vector included in the standardized selection signal Ssw is a length belonging to the search range W1, the comparator 45 generates the control signal Sc2 to control the switch 46 so as to select the vector signal Sv1, and then outputs the control signal Sc2 to the switch 46.

Accordingly, the switch 46 switches the vector signal Sv1 or the selection signal Ssw in accordance with the control signal Sc2, and then outputs the vector signal Sv to the movement compensation predicting unit 8.

According to the above-mentioned operations of the movement detecting unit 52 in the fourth embodiment, it is possible to achieve the effect of the combination of the first embodiment and the second embodiment.

(V1) Modified Embodiment

The modified embodiment of the present invention will be described below with reference to FIG. 8.

In the above-mentioned respective embodiments, each movement detecting unit generates the movement vector V by using only the input signal Sin. However, other than it, the movement vector may be generated by also using an image which is again prepared by the above-mentioned encoding process, by the movement detecting unit.

Figure 8:
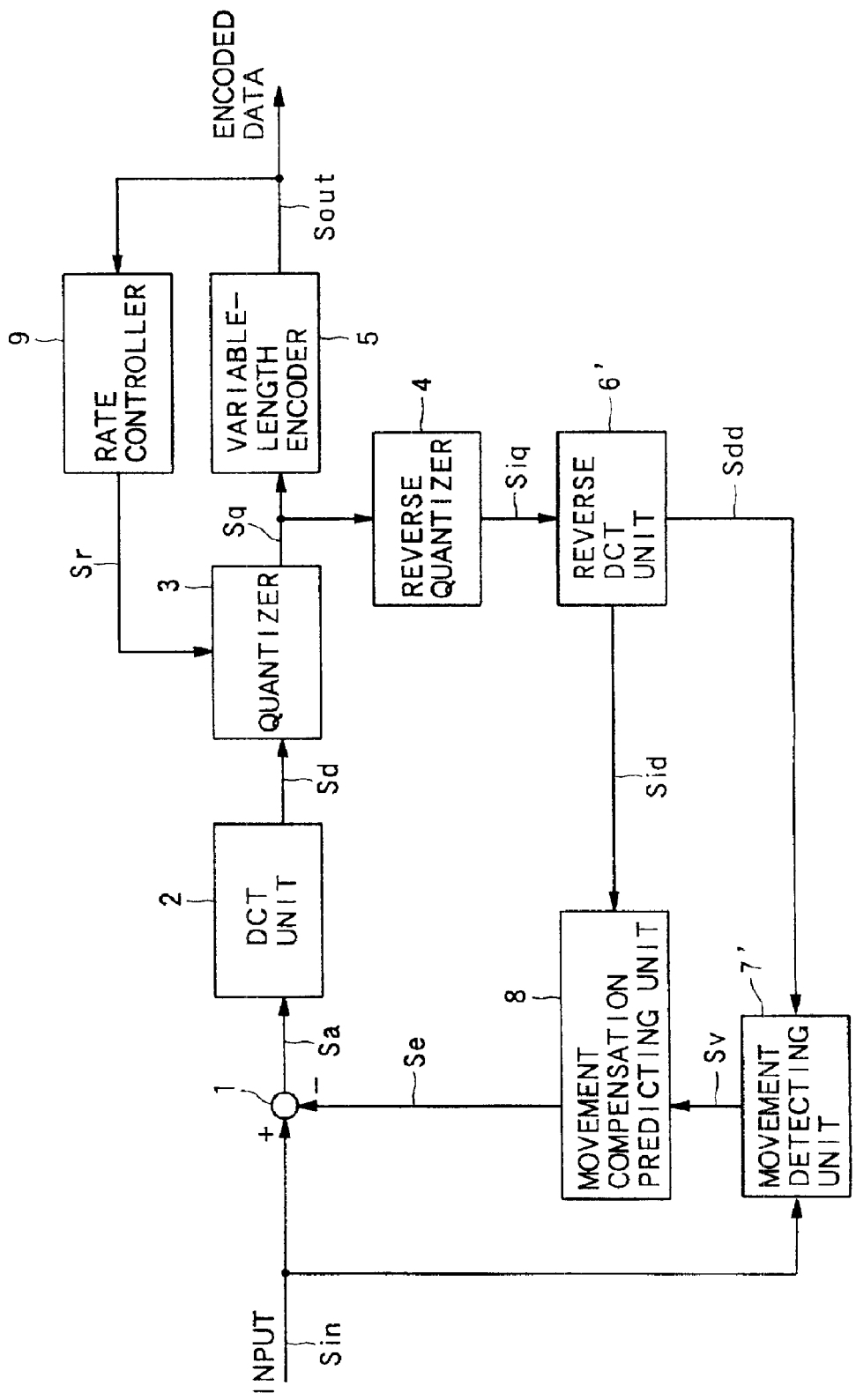
FIG. 8 is a block diagram showing a schematic configuration of an image encoding apparatus as a modified embodiment of the present invention.

That is, as shown in FIG. 8, instead of the reverse DCT unit 6 and the movement detecting unit 7 of the image encoding apparatus S in the first embodiment, an image encoding apparatus S' in the modified embodiment may be provided with: a reverse DCT unit 6' which generates a re-composed signal Sdd including the re-composed image together with the reverse DCT signal Sid based on the reverse quantization signal Siq; and a movement detecting unit 7' which generates a movement vector by using any one of the methods according to the first to fourth embodiments in accordance with the input signal Sin and the re-composed signal Sd, and accordingly generates a vector signal Sv, in addition to the adder 1, the DCT unit 2, the quantizer 3, the reverse quantizer 4, the variable-length encoder 5, the movement compensation predicting unit 8, and the rate controller 9.

The generation of the movement vector in accordance with this configuration can provide the effect of reducing the error of the prediction, in addition to the above-mentioned effects of the respective embodiments.

In addition, the case of using the single macro block as the pixel block has been described in the above-mentioned respective embodiments and modified embodiment. However, other than that case, a plurality of macro blocks adjacently to each other may be collectedly utilized as the single pixel block.

(VII) Example

An example of an image which is encoded by using the first embodiment among the above-mentioned respective embodiments will be described with reference to the following tables.

In this example, the $20^{th}$ image (hereafter, the 20th standard image is referred to as "soccer") and the $35^{th}$ image (hereafter, the 35th standard image is referred to as "horse race") are used from among the standard images for a hi-vision television determined by an image information media society (ITE). The simulation is performed by using the configuration of the movement detecting unit in the first embodiment.

That is, the average of SIN ratios of respective pictures (an I (Intra-coded) picture, a P (Predictive) picture and a B (Bidirectionally) picture) included in the encoded output signal Sout with respect to the images within the original input signal Sin are measured as for the case of generating all the movement vectors by using the entire search (in the following tables, referred to as "Entire Search"), the case of generating all the movement vectors by using the hierarchy search (in the following tables, referred to as "Hierarchy Search") and the case of generating the movement vectors by using the method of the first embodiment (in the following tables, referred to as "Adaptation Switch"), when compressing the data to the bit rates as compression targets (15 Mbps (bit per second), 20 Mbps and 30 Mbps) respectively shown in TABLE (a) in FIG. 9 and TABLE (b) in FIG. 10. In addition, "Total" in each column of these tables indicates the average of the SIN ratio of respective one of the pictures within the pertinent column.

Now explaining the respective standard images used in this experiment, the above-mentioned "soccer" photographs a certain soccer game, and this is the image in which a field for the game is widely illustrated. That is, the lawn within a stadium occupies the majority of a screen, a line of a field track is seen on the other side, and audience seats are positioned beyond it. Then, although soccer players wear brightly-colored uniforms, an individual player is tinily illustrated. Moreover, a camera is laterally shifting in coincidence with a movement of a ball. Furthermore, the whole screen is laterally shifted in conjunction with the lateral shift.

On the other hand, the above-mentioned "horse race" is a scene in which a plurality of horses are running in a racetrack. It is the horses that are actually running. However, a camera chasing the horses is also shifting. Accordingly, this is the image in which a background is shifted at a sufficient speed.

The TABLE (a) shows the result of the experiment with regard to the image "soccer", and the TABLE (b) shows the result of the experiment with regard to the image "horse race".

From the viewpoint of these experiment results, it is understood that the utilization of the method in the first embodiment improves the S/N, as compared with the case of executing the entire search or the hierarchy search for all the macro blocks, in any case of the compression targets.

By these results of the experiment, it can be confirmed that the present embodiment is especially effective for the image in which the movement is rather active.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-92673 filed on Mar. 20, 1998 including the specification, claims, drawings and summary is incorporated herein by reference in its entirety.

What is claimed is:

1. A movement vector generating apparatus for generating a movement vector for a movement compensation by means of an inter-frame prediction, when encoding image information including an image of a plurality of frames by using the movement compensation, said apparatus comprising:

a plurality of generating devices each for generating a we movement vector corresponding to a search range and a search accuracy between one frame and another frame, for each pixel block which is located within said one frame respectively in the image information and includes a plurality of pixels, said generating devices respectively using search ranges different from each other and search accuracies different from each other; and a selecting device for selecting one of the movement vectors generated by said generating devices, in accordance with characteristics of the image in said each pixel block, and then outputting the selected movement vector corresponding to said each pixel block, wherein said generating devices comprise:

a first generator for generating a first movement vector, with a preset first range as the search range; and a second generator for generating a second movement vector at a search accuracy lower than that of the first movement vector, with a preset second range wider than the first range as the search range, and wherein said selecting device comprises:

a first adding device for adding together absolute values of differences between a respective one of the pixels in the pixel block and its corresponding pixel in the frame targeted by the movement compensation, for all of the pixels in the pixel block, in said first generator to generate a first absolute value sum;

a second adding device for adding together absolute values of differences between a respective one of the pixels in the pixel block and its corresponding pixel in the frame targeted by the movement compensation, as for all of the pixels in the pixel block, in said second generator, to generate a second absolute value sum; and a standardizing device for standardizing the generated first and second absolute value sums, respectively, said selecting device comparing the standardized first absolute value sum with the standardized second absolute value sum, outputting the first movement vector as the selected movement vector if a difference between the standardized first absolute value sum and the standardized second absolute value sum is not greater than a predetermined threshold which is set in advance to detect a difference between the first movement vector and the second movement vector at a high accuracy, and outputting the second movement vector as the selected movement vector if the difference between the standardized first absolute value sum and the standardized second absolute value sum is greater than the predetermined threshold.

2. A movement vector generating method of generating a movement vector for a movement compensation by means of an inter-frame prediction, when encoding image information including an image of a plurality of frames by using the movement compensation, said method comprising:

a plurality of generating processes each for generating a movement vector corresponding to a search range and a search accuracy between one frame and another frame, for each pixel block which is located within said one frame respectively in the image information and includes a plurality of pixels, said generating processes respectively using search ranges different from each other and search accuracies different from each other; and a selecting process of selecting one of the movement vectors generated by the generating processes, in accordance with characteristics of the image in said each pixel block, and then outputting the selected movement vector corresponding to said each pixel block, wherein said generating processes comprise:

a first generating process of generating a first movement vector, with a preset first range as the search range; and a second generating process of generating a second movement vector at a search accuracy lower than that of the first movement vector, with a preset second range wider than the first range as the search range, and wherein said selecting process comprises:

a first adding process of adding together absolute values of differences between a respective one of the pixels in the pixel block and its corresponding pixel in the frame targeted by the movement compensation, for all of the pixels in the pixel block, in said first generating process, to generate a first absolute value sum;

a second adding process of adding together absolute values of differences between a respective one of the pixels in the pixel block and its corresponding pixel in the frame targeted by the movement compensation, for all of the pixels in the pixel block, in said second generating process, to generate a second absolute value sum; and a standardizing process of standardizing the generated first and second absolute value sums, respectively, said selecting process comparing the standardized first absolute value sum with the standardized second absolute value sum, outputting the first movement vector as the selected movement vector if a difference between the standardized first absolute value sum and the standardized second absolute value sum is not greater than a predetermined threshold which is set in advance to detect a difference between the first movement vector and the second movement vector at a high accuracy, and outputting the second movement vector as the selected movement vector if the difference between the standardized first absolute value sum and the standardized second absolute value sum is greater than the predetermined threshold.

3. An image encoding method comprising (a) a movement vector generating method of generating a movement vector for a movement compensation by means of an inter-frame prediction, when encoding image information including an image of a plurality of frames by using the movement compensation, said method comprising:

a plurality of generating processes each of generating the movement vector corresponding to a search range and a search accuracy between one frame and another frame, for each pixel block which is located within said one frame respectively in the image information and includes a plurality of pixels, said generating processes respectively using search ranges different from each other and search accuracies different from each other; and a selecting process of selecting one of the movement vectors generated by the generating processes, in accordance with characteristics of the image in said each pixel block, and then outputting the selected movement vector corresponding to said each pixel block, (b) a compensating process of performing the movement compensation on the basis of the selected movement vector outputted from the selecting process, to output a compensation signal, and (c) an encoding process of encoding the image information on the basis of the compensation signal, wherein the generating processes comprise:

a first generating process for generating a first movement vector using a first range as the search range; and a second generating process for generating a second movement vector using a search accuracy different than that of the first movement vector and using a second range different than the first range as the search range, and wherein the selecting process comprises:

a first adding process for adding together absolute values of differences between respective ones of the pixels in the pixel block and corresponding pixels in the frame targeted by movement compensation to generate a first absolute value sum, the differences added by the first adding process being calculated when the first movement vector is generated;

a second adding process for adding together absolute values of differences between respective ones of the pixels in the pixel block and corresponding pixels in the frame targeted by the movement compensation to generate a second absolute value sum, the differences added by the second adding process being calculated when the second movement vector is generated; and a standardizing process of standardizing the generated first and second absolute value sums, respectively, the selecting process comparing the standardized first absolute value sum with the standardized second absolute value sum, outputting the first movement vector as the selected movement vector if a difference between the standardized first absolute value sum and the standardized second absolute value sum is not greater than a specified threshold, and outputting the second movement vector as the selected movement vector if the difference between the standardized first absolute value sum and the standardized second absolute value sum is greater the specified threshold.

4. A movement vector generating apparatus for an image encoding system, comprising:

two or more vector generators each of which generates a movement vector indicative of movement of a pixel block from one frame to another, the vector generators having different search ranges and accuracies; and a selecting device for selecting, based on image characteristics of the pixel block, one of the movement vectors generated by the vector generators for use in a movement compensating process of the image encoding system, wherein the two or more vector generators comprise:

a first vector generator for generating a first movement vector using a first search range and a first search accuracy; and a second vector generator for generating a second movement vector using a second search range and a second search accuracy, and wherein the selecting device comprises:

a first adding device for adding together absolute values of differences between respective ones of the pixels of the pixel block of the one frame and corresponding pixels of the other frame to generate a first absolute value sum, the differences added by the first adding device being calculated when the first movement vector is generated;

a second adding device for adding together absolute values of differences between respective ones of the pixels of the pixel block of the one frame and corresponding pixels of the other frame to generate a second absolute value sum, the differences added by the second adding device being calculated when the second movement vector is generated; and a standardizing device for standardizing the generated first and second absolute value sums, the selecting device comparing the standardized first absolute value sum with the standardized second absolute value sum, outputting the first movement vector as the selected movement vector if a difference between the standardized first absolute value sum and the standardized second absolute value sum is not greater than a specified threshold, and outputting the second movement vector as the selected movement vector if the difference between the standardized first absolute value sum and the standardized second absolute value sum is greater than the specified threshold.

5. A movement vector generating apparatus according to claim 4, comprising three or more vector generators.

6. A movement vector generating process for an image encoding system, comprising:

two or more vector generating processes each of which generates a movement vector indicative of movement of a pixel block from one frame to another, the vector generating processes having different search ranges and accuracies; and a selecting process for selecting, based on image characteristics of the pixel block, one of the movement vectors generated by the vector generating processes for use in a movement compensating process of the image encoding system, wherein the two or more vector generating processes comprise:

a first vector generating process for generating a first movement vector using a first search range and a first search accuracy; and a second vector generating process for generating a second movement vector using a second search range and a second search accuracy, and wherein the selecting process comprises:

a first adding process for adding together absolute values of differences between respective ones of the pixels of the pixel block of the one frame and corresponding pixels of the other frame to generate a first absolute value sum, the differences added by the first adding process being calculated when the first movement vector is generated;

a second adding process for adding together absolute values of differences between respective ones of the pixels of the pixel block of the one frame and corresponding pixels of the other frame to generate a second absolute value sum, the differences added by the second adding process being calculated when the second movement vector is generated; and a standardizing process for standardizing the generated first and second absolute value sums, the selecting process comparing the standardized first absolute value sum with the standardized second absolute value sum, outputting the first movement vector as the selected movement vector if a difference between the standardized first absolute value sum and the standardized second absolute value sum is not greater than a specified threshold, and outputting the second movement vector as the selected movement vector if the difference between the standardized first absolute value sum and the standardized second absolute value sum is greater than the specified threshold.

7. A movement vector generating process according to claim 6, comprising three or more vector generating processes.

8. A movement vector generating apparatus for generating a movement vector for use in a movement compensating process of an image encoding system, comprising:

two or more movement vector generators each of which uses different search criteria to generate a respective movement vector indicative of movement of the same pixel block from one frame to another, and a selecting device for selecting, based on image characteristics of the pixel block, one of the movement vectors generated by the movement vector generators and outputting only the selected movement vector for use in the movement compensating process of the image encoding system, wherein the two or more movement vector generators comprise;

a first movement vector generator for generating a first movement vector using first search criteria; and a second movement vector generator for generating a second movement vector using second search criteria, and wherein the selecting device comprises:

a first adding device for adding together absolute values of differences between respective ones of the pixels of the pixel block of the one frame and corresponding pixels of the other frame to generate a first absolute value sum, the differences added by the first adding device being calculated when the first movement vector is generated;

a second adding device for adding together absolute values of differences between respective ones of the pixels of the pixel block of the one frame and corresponding pixels of the other frame to generate a second absolute value sum, the differences added by the second adding device being calculated when the second movement vector is generated, and a standardizing device for standardizing the generated first and second absolute value sums, the selecting device comparing the standardized first absolute value sum with the standardized second absolute value sum, outputting the first movement vector as the selected movement vector if a difference between the standardized first absolute value sum and the standardized second absolute value sum is not greater than a specified threshold, and outputting the second movement vector as the selected movement vector if the difference between the standardized first absolute value sum and the standardized second absolute value sum is greater than the specified threshold.

9. A movement vector generating apparatus according to claim 8, comprising three or more movement vector generators.

10. A movement vector generating process for generating a movement vector for use in a movement compensating process of an image encoding system, comprising:

two or more movement vector generating processes each of which uses different search criteria to generate a respective movement vector indicative of movement of the same pixel block from one frame to another, and a selecting process for selecting, based on image characteristics of the pixel block, one of the movement vectors generated by the movement vector generating processes and outputting only the selected movement vector for use in the movement compensating process of the image encoding system, wherein the two or more movement vector generating processes comprise:

a first movement vector generating process for generating a first movement vector using first search criteria; and a second movement vector generating process for generating a second movement vector using second search criteria, and wherein the selecting process comprises:

a first adding process for adding together absolute values of differences between respective ones of the pixels of the pixel block of the one frame and corresponding pixels of the other frame to generate a first absolute value sum, the differences added by the first adding process being calculated when the first movement vector is generated;

a second adding process for adding together absolute values of differences between respective ones of the pixels of the pixel block of the one frame and corresponding pixels of the other frame to generate a second absolute value sum, the differences added by the second adding process being calculated when the second movement vector is generated; and a standardizing process for standardizing the generated first and second absolute value sums, the selecting the standardized first absolute value sum with the standardized second absolute value sum, outputting the first movement vector as the selected movement vector if a difference between the standardized first absolute value sum and the standardized second absolute value sum is not greater than a specified threshold, and outputting the second movement vector as the selected movement vector if the difference between the standardized first absolute value sum and the standardized second absolute value sum is greater than the specified threshold.

11. A movement vector generating process according to claim 10, comprising three or more movement vector generating processes.

* * * * *